US009133923B2

United States Patent
Ito et al.

(10) Patent No.: US 9,133,923 B2
(45) Date of Patent: Sep. 15, 2015

(54) ROTARY ACTUATOR

(71) Applicant: NABTESCO CORPORATION, Tokyo (JP)

(72) Inventors: Koji Ito, Gifu (JP); Takashi Koizumi, Gifu (JP)

(73) Assignee: Nabtesco Corporation, Tokyo (JP)

( * ) Notice: Subject to any disclaimer, the term of this patent is extended or adjusted under 35 U.S.C. 154(b) by 371 days.

(21) Appl. No.: 13/662,967

(22) Filed: Oct. 29, 2012

(65) Prior Publication Data

US 2013/0104729 A1    May 2, 2013

(30) Foreign Application Priority Data

Oct. 31, 2011  (JP) .................................. 2011-238213

(51) Int. Cl.
  *F16H 29/02*  (2006.01)
  *F01C 1/063*  (2006.01)
  *F01C 9/00*  (2006.01)
(52) U.S. Cl.
  CPC ................ *F16H 29/02* (2013.01); *F01C 1/063* (2013.01); *F01C 9/002* (2013.01)
(58) Field of Classification Search
  CPC ........ F15B 15/125; F16H 29/02; F01C 1/063; F01C 9/002
  USPC .......................................... 92/120, 122, 125
  See application file for complete search history.

(56) References Cited

U.S. PATENT DOCUMENTS

| 3,444,788 | A | * | 5/1969 | Sneen ............................ 92/120 |
| 3,446,120 | A | * | 5/1969 | Sneen ............................ 92/120 |
| 3,731,597 | A | * | 5/1973 | Payne ............................ 92/120 |
| 5,235,900 | A | * | 8/1993 | Garceau ......................... 92/120 |
| 5,601,165 | A |   | 2/1997 | Oppitz et al. |

FOREIGN PATENT DOCUMENTS

| JP | S35-1710 B | 3/1960 |
| JP | S44-12168 B | 6/1969 |
| JP | H04-093502 U | 8/1992 |

OTHER PUBLICATIONS

An Office Action; "Notice of Reason for Rejection," issued by the Japanese Patent Office on Jul. 31, 2015, which corresponds to Japanese Patent Application No. 2011-238213 and is related to U.S. Appl. No. 13/662,967; with English language translation.

* cited by examiner

*Primary Examiner* — Thomas E Lazo

(74) *Attorney, Agent, or Firm* — Studebaker & Brackett PC

(57) ABSTRACT

A cylinder is installed within a case. An output shaft is installed in a hollow space within the cylinder. A pair of pistons extend in an arc, and is supported so as to be able to slide and be displaced along a circumferential direction of the cylinder within the cylinder. The pair of pistons is able to urge an arm integrated with the output shaft from two sides of the arm. Pressure chambers into which a pressure medium is introduced are defined between the cylinder and each piston in the pair of pistons. The pressure medium is fed to one of the pressure chambers and drained from the other, and thus the arm is displaced, and the output shaft pivots in a rotational direction.

6 Claims, 10 Drawing Sheets

ROTARY ACTUATOR

CROSS-REFERENCE TO RELATED APPLICATION

This application claims priority to Japanese Patent Application No. 2011-238213. The entire disclosure of Japanese Patent Application No. 2011-238213 is hereby incorporated herein by reference.

BACKGROUND OF THE INVENTION

1. Field of the Invention

The present invention relates to rotary actuators that output driving torque as a result of output shafts pivoting in a rotational direction due to action of a pressure medium.

2. Description of the Related Art

A rotary actuator having such a configuration as the one disclosed in U.S. Pat. No. 5,601,165 is known as one of the rotary actuators that output driving torque as a result of an output shaft pivoting in a rotational direction due to action of a pressure fluid serving as a pressure medium.

In the rotary actuator disclosed in U.S. Pat. No. 5,601,165, ribs are provided within a cylinder as an integral unit, and vanes are provided to an output shaft rotatably installed within the cylinder. Both ends of the cylinder are provided with end caps. The ribs and the inner wall surface of the cylinder, as well as the vanes and the outer wall surface of the output shaft form pressure chambers. Adjoining pressure chambers are alternatively supplied with a pressure fluid, the output shaft thereby pivots in a rotational direction due to action of the pressure fluid, and, as a result, driving torque is output.

In the above rotary actuator, seals are inserted into grooves provided on the ribs and the vanes. The seals inserted into the ribs are pressed against the outer wall surface of the output shaft, and the seals inserted into the vanes are pressed against the inner wall surface of the cylinder. Thus the adjoining pressure chambers are sealed against each other. The pressure chambers are also sealed against each other by means of gaskets between the end caps and the output shaft, as well as between the end caps and the vanes.

SUMMARY OF THE INVENTION

In a conventional general rotary actuator such as the one disclosed in U.S. Pat. No. 5,601,165, a rotary sliding portion between the rotary output shaft and the ribs provided on the cylinder is sealed by the seals inserted into the ribs. A rotary sliding portion between the vanes provided on the rotary output shaft and the cylinder is also sealed by the seals inserted into the vanes. Furthermore, rotary sliding portions between the rotary output shaft and the end caps, as well as between the vane and the end caps are also sealed by the gaskets.

Unfortunately, it is difficult to suppress leakage of the pressure fluid in the rotary sliding portions by means of the seals. In the conventional rotary actuators such as the one disclosed in U.S. Pat. No. 5,601,165, leakage occurs from the seals or the gaskets in many cases under the current circumstances. Therefore, the pressure fluid often leaks within the rotary actuator. Moreover, the conventional rotary actuators have a structure in which the seals are inserted into the grooves in the ribs or the vanes, the problem of leakage between the grooves and the seals also arises. Furthermore, since each seal inserted into the groove has corner sections, it is particularly difficult to maintain adhesion to the surface relative to which the seal slides, in those corner sections and in the vicinity thereof, which makes it difficult to suppress leakage. Therefore, the pressure fluid leaks more often within the rotary actuator.

In addition, the conventional rotary actuators need high-pressure rotary seals that are used in the rotary sliding portions and pressed with high pressure against the surface relative to which the seals slide. Such seals are therefore different from statically used seals or those for use in linear sliding portions, and another problem arises of significantly shorter duration of the seals during which sealing characteristics intended by the design can be maintained. For that reason, a rotary actuator whose structure does not need the high-pressure rotary seals is desired to be realized.

In light of the foregoing circumstance, it is an object of the present invention to provide a rotary actuator capable of reducing internal leakage of the pressure medium, and whose structure does not need the high-pressure rotary seals.

To achieve the above-stated object, a first feature of the rotary actuator according to the present invention is an rotary actuator that outputs driving torque as a result of an output shaft pivoting in a rotational direction due to action of a pressure medium, the rotary actuator including: a case; a cylinder that is installed within the case and internally has a hollow space; an output shaft that is rotatably supported with respect to the case, has an axial direction parallel to an axial direction of the cylinder, and is installed in the hollow space; and a pair of pistons each of which has a portion extending in an arc, and is installed within the cylinder and supported so as to be able to slide and be displaced with respect to the cylinder along a circumferential direction of the cylinder, the pair of pistons being provided so as to be able to urge an arm that is integrated with, or fixed to, the output shaft, and extends in a radial direction of the cylinder from both sides of the arm in the circumferential direction of the cylinder, a pressure chamber into which a pressure medium is introduced being defined between each of the pistons and the cylinder, the arm being displaced in the circumferential direction of the cylinder and the output shaft pivoting in the rotational direction, as a result of the pressure medium being fed to the pressure chamber defined by one of the pistons and drained from the pressure chamber defined by the other piston.

With this configuration, inside the cylinder installed within the case, the pressure medium is fed to one pressure chamber in the pair of pressure chambers and drained from the other, and the pair of pistons thereby slide and are displaced in the circumferential direction of the cylinder. As a result of the arm being urged by the pair of pistons, the output shaft pivots in the rotational direction, and the driving torque of the rotary actuator is output. Therefore, with the rotary actuator having the above-described configuration, the pressure chambers are defined between the cylinder and the pistons that slide within the cylinder with respect thereto. Thus, the structure including pressure chambers defined by an output shaft, vanes, a cylinder, ribs, and end caps, such as the structure of the conventional rotary actuators, is not necessary. That is, the rotary actuator having the above-described configuration does not need the rotary sliding portion between an output shaft and ribs provided to a cylinder, the rotary sliding portion between the cylinder and vanes provided to the rotary output shaft, and rotary sliding portions between the rotary output shaft with vanes and end caps. Accordingly, with the above-described configuration, internal leakage of the pressure medium within the rotary actuator can be reduced. In addition, the rotary actuator having the above-described rotary actuator does not need the high-pressure rotary seals that are used in the rotary sliding portions and pressed with high pressure against the surface relative to which the seals slide.

Therefore, according to the above-described configuration, it is possible to provide a rotary actuator capable of reducing internal leakage of the pressure medium, and whose structure does not need the high-pressure rotary seals.

A second feature of the rotary actuator according to the present invention is that in the rotary actuator of the first feature, the cylinder includes a plurality of cylinder blocks formed in a divided state, the cylinder is integrally assembled by putting together the plurality of cylinder blocks along the axial direction of the cylinder, the cylinder is provided with a piston chamber that houses the pistons supported so as to be able to slide and be displaced with respect to the cylinder, and the piston chamber is defined between the cylinder blocks adjoining in the axial direction of the cylinder.

With this configuration, the cylinder is assembled by the plurality of cylinder blocks being put together in the axial direction of the cylinder, and the piston chamber is defined between the adjoining cylinder blocks. Therefore, when the piston chamber is formed, a semicircular groove is formed in each cylinder block, and the grooves are combined to constitute the piston chambers. It is thus possible to easily form the piston chamber for housing the pistons that slide and are displaced in the circumferential direction of the cylinder, and to easily manufacture the cylinder.

A third feature of the rotary actuator according to the present invention is that the rotary actuator of the first feature further includes a plurality of piston units, each being constituted by the pair of pistons, wherein the plurality of piston units are arranged in line in the axial direction of the output shaft.

With this configuration, the arm is urged by the plurality of piston units that are arranged in line in the axial direction of the output shaft, and, as a result, the output shaft is driven. Therefore, it is possible to output a larger amount of driving torque with a compact structure, without increasing the size of the cylinder in its radial direction.

A fourth feature of the rotary actuator according to the present invention is that in the rotary actuator of the first feature, wherein a plurality of the arms are provided so as to extend in the radial direction of the cylinder from a plurality of positions on the output shaft.

With this configuration, the arms are provided so as to extend from a plurality of positions on the output shaft in its radial direction. Therefore, if more than one unit of pairs of pistons for driving the output shaft to rotate via the arms are installed, the installation positions thereof can be designed more freely. Note that the arms may be provided so as to extend in the radial direction of the cylinder from the plurality of positions on the output shaft in the axial direction thereof, for example. Furthermore, the arms may be provided so as to extend from the plurality of positions on the output shaft in radial directions of the cylinder, forming different angles in the circumferential direction of the cylinder. Furthermore, it is also possible to configure the rotary actuator having a structure in which the plurality of arms are located at the same position in the axial direction of the output shaft, and extend while forming different angles in the circumferential directions of the cylinder. In this case, it is possible to output lager driving torque while preventing the cylinder from becoming longer in its axial direction, and also preventing the cylinder from becoming larger in its radial direction.

A fifth feature of the rotary actuator according to the present invention is that in the rotary actuator of the first feature, the cylinder is provided with a piston chamber that houses the pistons supported so as to be able to slide and be displaced with respect to the cylinder, and the piston chamber is defined by a tubular hollow member that is installed in a main body of the cylinder and extends in an arc.

With this configuration, the member for defining each piston chamber is constituted by the tubular hollow member provided separately from the main body of the cylinder. It is therefore possible to easily form the piston chamber having a structure in which the surface relative to which the pistons slide is seamless, and further, internal leakage can be reduced.

A sixth feature of the rotary actuator according to the present invention is that in the rotary actuator of the third feature, among the plurality of piston units, the number of piston units that generate urging force applied to the arm can be changed to drive the arm.

With this configuration, among the plurality of piston units, the number of the piston units that generate urging force applied to the arm can be changed to drive the arm, and it is therefore possible to easily achieve the structure of the rotary actuator with which the output is variable.

It should be appreciated that the above and other objects, features and advantages of the present invention will become apparent from the following description taken in conjunction with the accompanying drawings.

BRIEF DESCRIPTION OF THE DRAWINGS

FIG. 3 is a cross-sectional view of a cylinder in the rotary actuator shown in

FIG. 2.

DETAILED DESCRIPTION OF THE INVENTION

Embodiments for implementing the present invention will be hereinafter described with reference to the drawings. Note that the present invention can be applied broadly to rotary actuators that output driving torque as a result of output shafts pivoting in a rotational direction due to action of a pressure medium.

Figure 1:
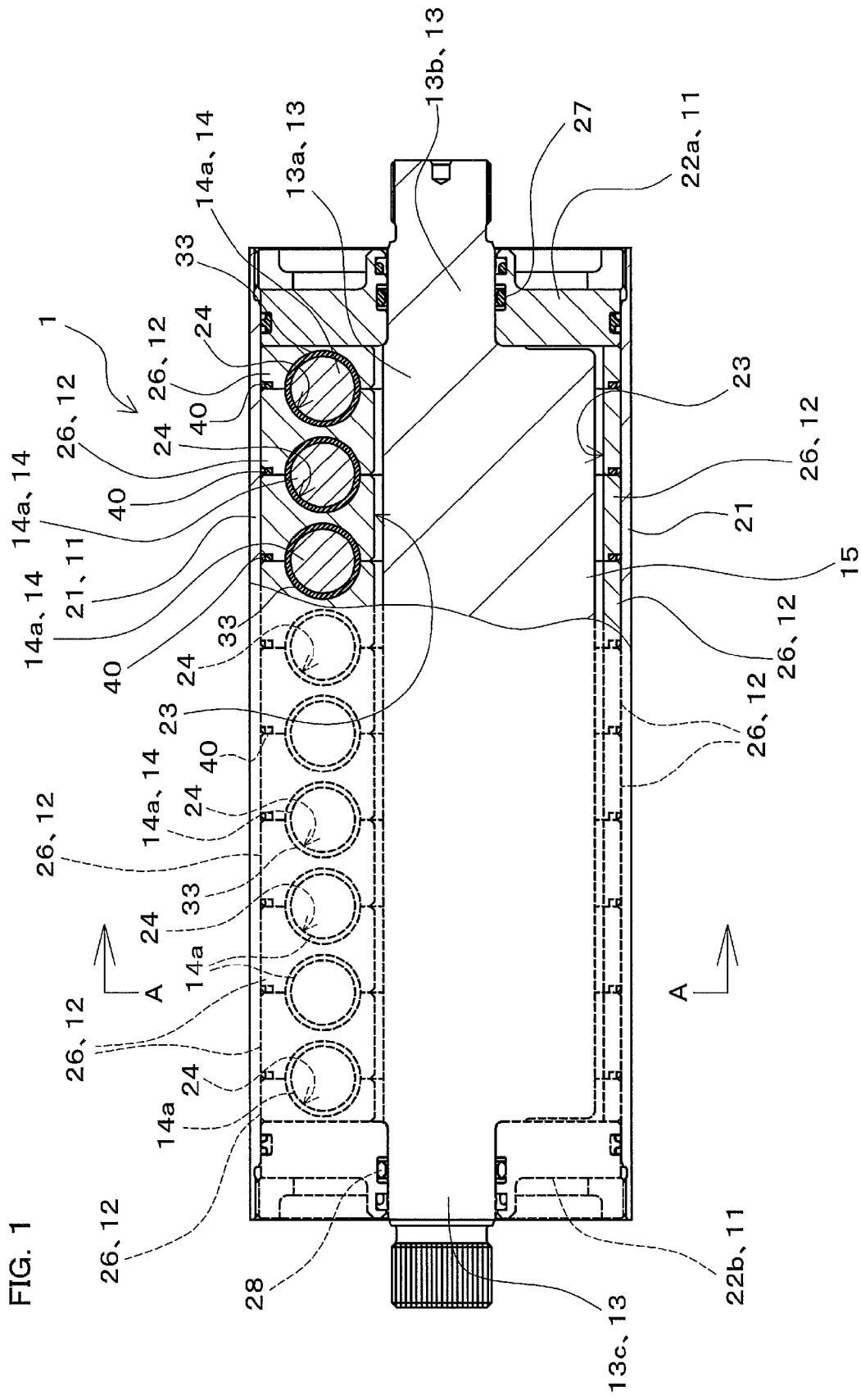
FIG. 1 is a diagram showing a rotary actuator according to one embodiment of the present invention including a partial cross-sectional view thereof, viewed from a direction perpendicular to an axial direction thereof.
Figure 2:
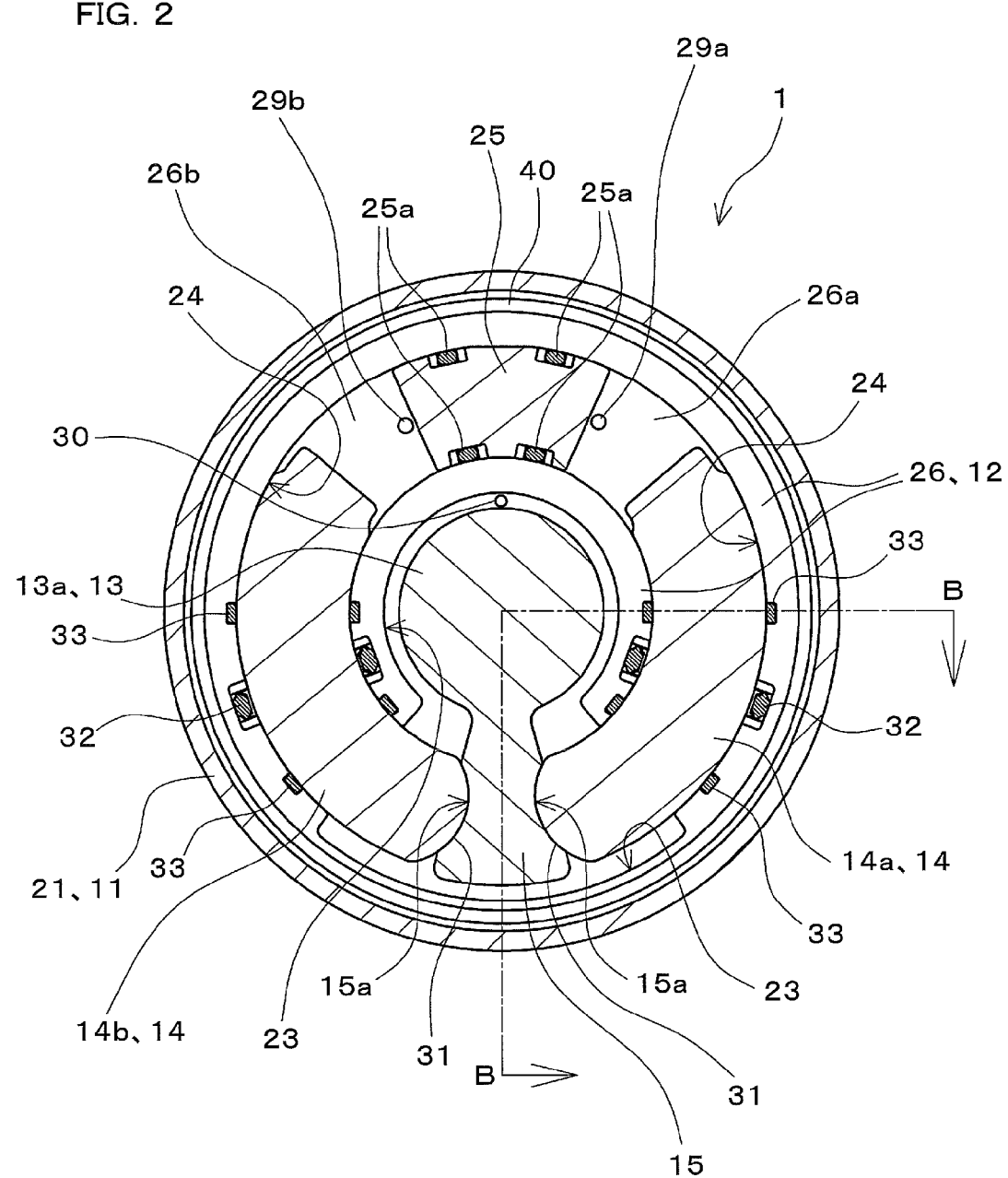
FIG. 2 is a cross-sectional view of the rotary actuator shown in FIG. 1, viewed along arrows A-A.

FIG. 1 is a diagram showing a rotary actuator 1 according to one embodiment of the present invention including a partial cross-sectional view thereof, viewed from a direction perpendicular to an axial direction thereof. FIG. 2 is a cross-sectional view of the rotary actuator 1, viewed along arrows A-A FIG. 1. Note that FIG. 1 includes the cross section viewed along arrows B-B in FIG. 2.

The rotary actuator 1 shown in FIGS. 1 and 2 is provided as an actuator that outputs driving torque as a result of an output shaft 13 pivoting in a rotational direction around its shaft center due to action of a pressure medium. The pressure medium can be various kinds of pressure fluid such as compressed air or pressure oil. The pressure medium may be powder in the form of powder particle made of a metal material, a resin material, a ceramic material, a composite material of those materials, or the like. Note that the present embodiment will be described, taking, as an example, a mode of using pressure oil as the pressure medium.

As shown in FIGS. 1 and 2, the rotary actuator 1 is provided with a case 11, a cylinder 12, an output shaft 13, a plurality of piston units 14, an arm 15, and so on. Note that the case 11, the cylinder 12, the output shaft 13, the piston units 14, and the arm 15 are made mainly of metal material such as, for example, stainless steel, titanium alloy, or aluminum alloy.

The case 11 has a case main body portion 21 and a pair of lid portions (22a, 22b). The case main body portion 21 is provided as, for example, a cylindrical member, which is hollow and open at its both ends. The lid portions (22a, 22b) are respectively inserted into, and thus fixed to the open ends. This pair of lid portions (22a, 22b) closes the both ends of the case main body portion 21. Each of the lid portions (22a, 22b) is provided as, for example, a disk-shaped member. In addition, each of the lid portions (22a, 22b) has a through hole in its center through which the ends of the output shaft 13, which will be described later, pass and protrude.

Figure 3:
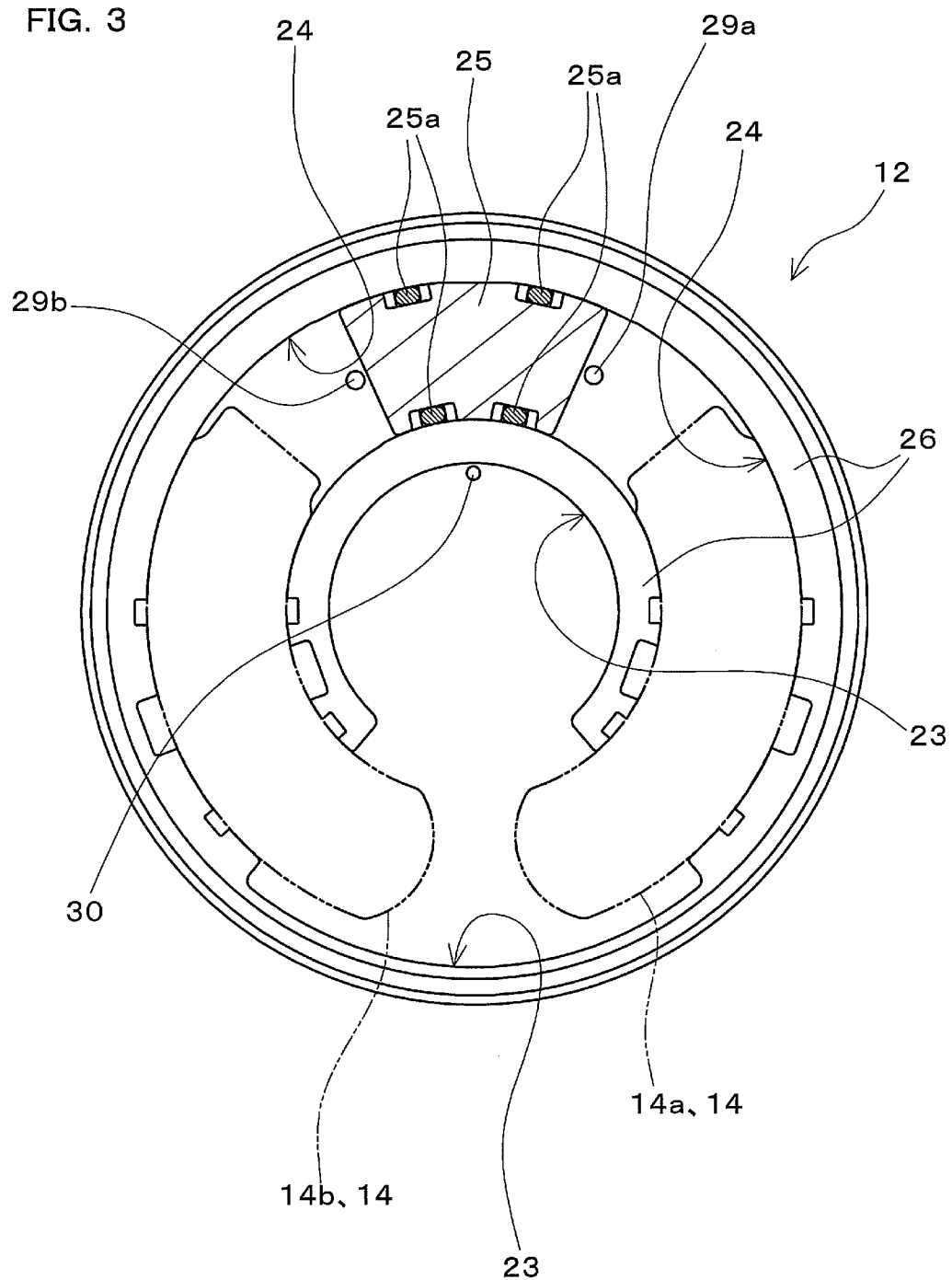

FIG. 3 is a cross-sectional view of the cylinder 12 on the cross section corresponding to FIG. 2. Note that in FIG. 3, the piston unit 14 is also shown by two-dot chain lines. As shown in FIGS. 1 to 3, the cylinder 12 is a cylindrical structure installed within the case 11 and internally provided with a hollow space 23. The hollow space 23 is a hollow space extending along the axial direction of the cylinder 12, and the output shaft 13, which will be described later, is installed therein. Note that the axial direction of the cylinder 12, the axial direction of the actuator 1, which is the longitudinal direction thereof, the cylinder axial direction of the case 11, and the axial direction of the output shaft 13 are parallel to one another, and may be the same direction.

Within the cylinder 12 a plurality of piston chambers 24 are provided, each being a long hole extending in an arc along the circumferential direction of the cylinder 12. The piston chambers 24 are arranged in line along the axial direction of the cylinder 12. Each piston chamber 24 is provided as a hole that communicates with the hollow space 23 within the cylinder 12. Further, each piston chamber 24 is defined by the piston unit 14, which will be described later, so as to control the movement of the pressure oil between the piston chamber 24 and the hollow space 23.

In the center in the arc direction of each piston chamber 24, which is a long hole extending in an arc, a plug block 25 provided as a defining structure for defining the piston chamber 24 are inserted and fixed. The plug block 25 is provided as a member that extends in a short distance in an arc along the longitudinal direction of the piston chamber 24, and has a circular cross section whose diameter size corresponds to that of the piston chamber 24.

Further, a plurality of seal grooves are formed on the outer circumference of the plug block 25, and ring-shaped seal members 25a are inserted into those seal grooves. The seal members 25a are seal members for static use with low pressure. The outer circumference of the plug blocks 25 and the wall portion of the piston chambers 24 are sealed against each other by those seal members 25a. Note that in each piston chamber 24, a pair of pressure chambers (26a, 26b), which will be described later, are defined between the plug block 25 and the piston unit 14.

Further, the cylinder 12 is provided with a plurality of cylinder blocks 26 formed in a divided state. Each cylinder block 26 is provided as a cylindrical member whose length in the axial direction is short. The cylinder blocks 26 are put together along the axial direction of the cylinder 12 within the case main body portion 21 of the case 11, and thus the cylinder 12 is integrally assembled.

Further, each cylinder block 26 is provided with a region formed as a through hole that constitutes part of the hollow space 23, and grooves having a semicircular cross section and extending in an arc along the circumferential direction of the cylinder 12. Each cylinder block 26 installed at a position other than both ends in the axial direction of the cylinder 12 is provided with those grooves on both end faces in the axial direction, and each cylinder block 26 installed at both ends in the axial direction of the cylinder 12 is provided with the groove on one end face in the axial direction. Those grooves are put together so as to face each other to form a circular cross section between the cylinder blocks 26 adjoining in the axial direction of the cylinder 12, thereby defining the piston chambers 24. When the cylinder blocks 26 are put together to form the piston chambers 24, the plug blocks 25 are fixed between the cylinder blocks 26. Note that in the present embodiment, the defining structures for defining the piston chambers 24 are provided, separately from the cylinder blocks 26, as the plug blocks 25 inserted into and fixed to the piston chambers 24. However, this need not be the case. An embodiment in which the defining structures are integrated with the cylinder blocks 26 may alternatively be implemented.

Further, in the cylinder blocks 26 adjoining in the axial direction of the cylinder 12, a fitting face on which the above-mentioned semicircular grooves are formed and put together is formed as a plain face so that the cylinder blocks 26 are brought into close contact with each other. Thus leakage of the pressure oil between the adjoining cylinder blocks 26 is sufficiently prevented. Note that a ring-shaped seal member 40 is inserted into one of two adjoining cylinder blocks 26 at an edge portion on the outer circumference of the fitting face. The seal member 40 is a seal member for static use with low pressure.

Further, in the present embodiment, among the plurality of cylinder blocks 26, the cylinder blocks 26 installed at positions other than both ends in the axial direction of the cylinder 12 and those installed at the both ends have different configurations of the fitting face. In the cylinder blocks 26 installed at positions other than both ends in the axial direction of the cylinder 12, both end faces in the axial direction of the cylinder 12 are provided as fitting faces that are closely fitted to the cylinder block 26 to be fitted together, and define the piston chamber 24. On the other hand, in the cylinder blocks 26 installed at the both ends in the axial direction of the cylinder 12, one end face is provided as a fitting face that is closely fitted to the cylinder block 26 to be fitted together and defines the piston chamber 24, and the other face is provided as a fitting face closely fitted to the lid portion 22a or 22b.

Note that when forming the above-mentioned grooves each having a semicircular cross section that make holes each with a circular cross section to form the piston chambers 24 as a result of the cylinder blocks 26 being combined with one another, firstly machining of the material of the cylinder blocks 26 is performed to make the grooves extending in an arc in the circumferential direction of the cylinder 12, for example. After the machining, polishing is performed on the machined wall surface that constitutes the semicircular cross section, thereby forming the grooves extending in an arc in the circumferential direction of the cylinder 12 having a smooth circular cross section.

The output shaft 13 is rotatably supported with respect to the case 11 and installed in the hollow space 23, with the axial direction thereof being parallel to the axial direction of the cylinder 12. The output shaft 13 has a shaft portion 13a and end portions (13b, 13c).

The shaft portion 13a is provided as a columnar portion whose axial direction is parallel to the direction conformable to the axial direction of the cylinder 12. The end portions (13b, 13c) are integrated with the both ends of the shaft portion 13a.

The end portion 13b is supported so as to be able to slide and rotate with respect to the lid portion 22a of the case 11. The end portion 13c is supported so as to be able to slide and rotate with respect to the lid portion 22b of the case 11.

Between the outer circumference of the end portion 13b and the inner circumference of the through hole of the lid portion 22a, a ring-shaped seal member 27 is installed. In the present embodiment, the seal member 27 is inserted into a seal groove formed on the inner circumference of the lid portion 22a, and the end portion 13b is inserted within the seal member 27. Meanwhile, between the outer circumference of the end portion 13c and the inner circumference of the through hole of the lid portion 22b, a ring-shaped seal member 28 is installed. In the present embodiment, the seal member 28 is inserted into a seal groove formed on the inner circumference of the lid portion 22b, and the end portion 13c is inserted within the seal member 28. The output shaft 13 and the case 11 are sealed against each other by those seal members (27, 28).

Note that the hollow space 23 in which the output shaft 13 and the lid portions (22a, 22b) face each other is a low-pressure chamber that communicates with a reservoir circuit 36 (see FIG. 5) having a tank in which oil released into atmospheric pressure are accumulated, and seal members for use with low pressure are used as the seal members (27, 28). Furthermore, the seal grooves into which the seal members (27, 28) are inserted do not have to be provided in the lid portions (22a, 22b). The seal grooves into which the seal members (27, 28) are inserted may be provided only in the end portions (13b, 13c), or may alternatively be provided on both the lid portions (22a, 22b) and the end portions (13b, 13c).

The arm 15 is, in the present embodiment, provided as a thick plate-shaped portion having a substantially trapezoid-shaped cross section and extending parallel to the axial direction of the output shaft 13, and is integrated with the shaft portion 13a of the output shaft 13. Note that the arm 15 may be provided as a separate member from the output shaft 13 and fixed thereto. The arm 15 is installed with the output shaft 13 in the hollow space 23.

Surfaces of the arm 15 at both ends in the circumferential direction of the cylinder 12 are provided so as to expand along a plane perpendicular to the circumferential direction of the cylinder 12. Those surfaces of the arm 15 have concave portion 15a abutted respectively by end portions of the arc pistons (14a, 14b) of the piston unit 14, which will be described later. A plurality of concave portions 15a are arranged in line along the axial direction of the output shaft 13 on the surfaces of the arm 15 on both sides in the circumferential direction of the cylinder 12 at positions corresponding to the positions of the piston units 14. Each concave portion 15a is formed so as to conform to the shape of end portions of each arc piston (14a, 14b) of the piston units 14, and is formed, for example, convexly in a shape that forms part of a sphere.

Figure 4:
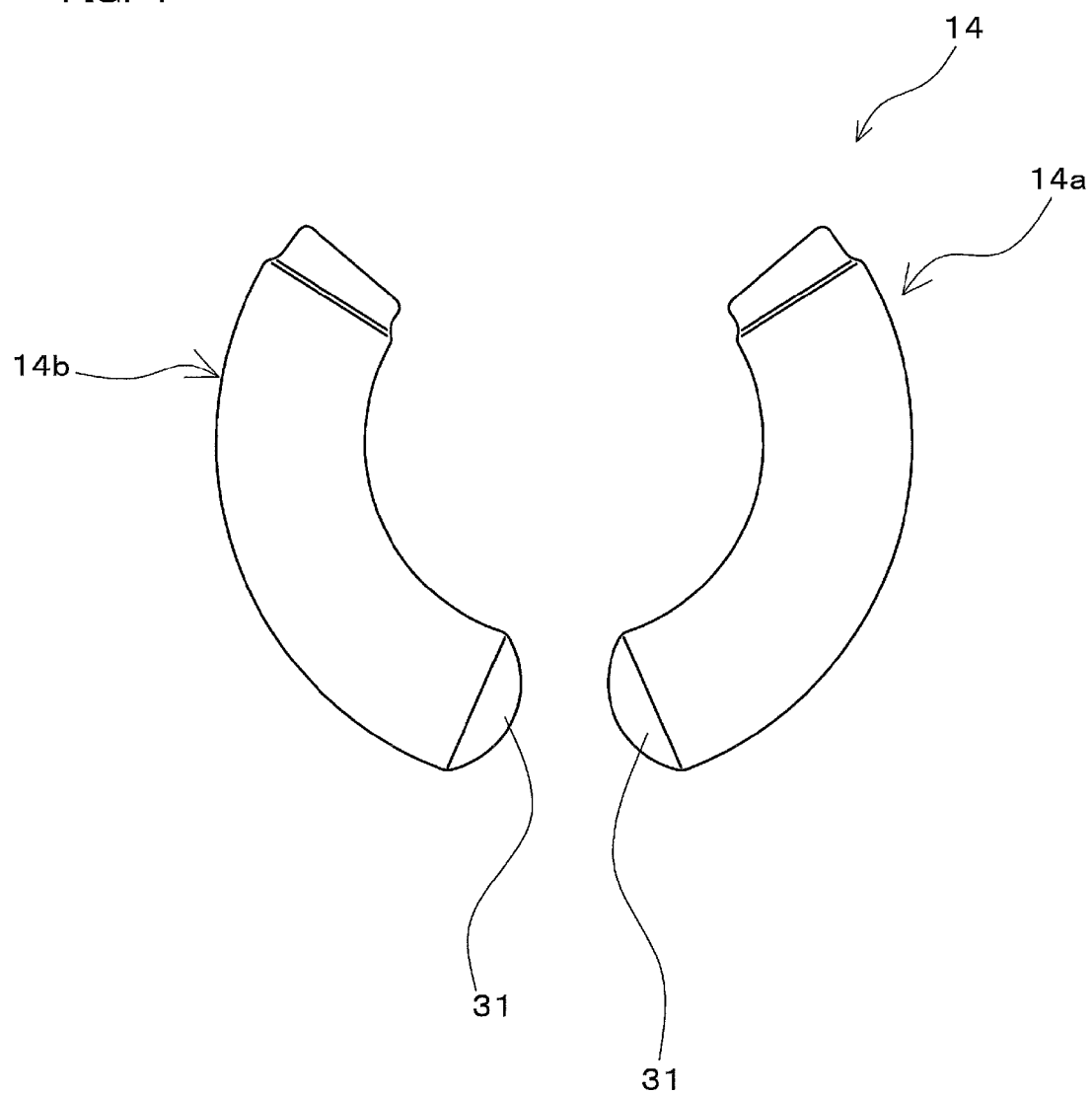
FIG. 4 is a diagram showing a piston unit in the rotary actuator shown in FIG. 2.

FIG. 4 is a diagram showing a single piston unit 14. In the rotary actuator 1, a plurality of piston units 14 shown in FIGS. 1 to 4 are provided, and each piston unit 14 is provided as a pair of arc pistons (14a, 14b). The piston units 14 are arranged in line in the axial direction of the output shaft 13. Each of the arc pistons (14a, 14b) constitutes a piston in the present embodiment. Further, each of the arc pistons (14a, 14b) has an arc shape, and is provided with a portion having a circular cross section and extending in an arc.

The arc pistons (14a, 14b) are installed in the piston chambers 24 within the cylinder 12, and supported so as to be able to slide and be displaced with respect to the cylinder 12 along the circumferential direction of the cylinder 12. Each pair of arc pistons (14a, 14b) is installed at positions that sandwich the plug block 25 in a single piston chamber 24 defined by two adjoining cylinder blocks 26. The pair of arc pistons (14a, 14b) are installed so as to be able to slide with respect to the wall surface of the piston chamber 24 along a direction in which the piston chamber 24 extends in an arc. Note that in the cylinder 12, the piston chambers 24 are provided as spaces for housing the arc pistons (14a, 14b) supported so as to be able to slide and be displaced with respect to the cylinder 12.

Further, seal grooves are formed on the wall surface of each piston chamber 24, and ring-shaped seal members 32 are inserted into these seal grooves. For example, two seal members 32 are installed for the respective arc pistons (14a, 14b) in each piston chamber 24. The arc pistons (14a, 14b) are slidably inserted into the respective seal members 32. Thus the liquid tightness or air tightness between the wall surface of the piston chambers 24 and the outer circumference of the arc pistons (14a, 14b) is further improved. Those seal members 32 are provided as the seal members whose specifications are similar to those of the seal members used in linear sliding portion. Note that these seal members 32 do not have to be provided. Even in that case, the wall surface of the piston chambers 24 and the outer circumference of the arc pistons (14a, 14b) are sufficiently sealed against each other. Furthermore, a configuration in which the seal members 32 are inserted not into the piston chambers 24 but into the arc pistons (14a, 14b) may alternatively be implemented.

A plurality of ring insertion grooves are formed on the wall surface of each piston chamber 24, and ring members 33 made of bronze are inserted into the respective ring insertion grooves. A plurality of the ring members 33 are provided for the arc pistons (14a, 14b) in each piston chamber 24. The arc pistons (14a, 14b) are slidably inserted into the ring members 33. Thus seizing is further efficiently prevented from occurring between the wall surface of the piston chambers 24 and the outer circumferences of the arc pistons (14a, 14b).

Note that when manufacturing the arc pistons (14a, 14b), first, for example, two portions of a circular ring member in its circumferential direction are cut off by machining. The two portions that are thus cut off are set to be, for example, two portions to face each other via the center of the circular ring member in its radial direction, that is, two portions perpendicular to the radial direction of the circular ring member. Thus the material of the pair of arc pistons (14a, 14b) is cut out of the circular ring member. Next, polishing is performed on the outer circumference of the material of the pair of arc pistons (14a, 14b), thereby forming the outer circumferential surface of the arc pistons (14a, 14b) that form a circumferential cross section and slide with respect to the piston chambers 24.

The pair of arc pistons (14a, 14b) that constitutes each piston unit 14 is provided so as to be able to urge the arm 15 from both sides of the cylinder 12 in the circumferential direction of the cylinder 12. The end portions 31 of the arc pistons (14a, 14b) on the side other than the side facing the plug block 25 are installed so as to protrude from openings to the hollow space 23 on both ends of the piston chambers 24.

The end portions 31 of the arc pistons (14a, 14b) are formed into, for example, a shape that forms part of a sphere. The end portion 31 of the arc piston 14a is installed so as to be inserted into and abut the concave portion 15a provided on one of the two surfaces of the arm 15 in the circumferential direction of the cylinder 12. Further, the end portion 31 of the other arc piston 14b is installed so as to be inserted into and abut the concave portion 15a provided on the other surface of the arm 15 in the circumferential direction of the cylinder 12. Note that the end portions 31 of the arc pistons (14a, 14b) may be joined with the arm 15 by a pin member or the like.

In each piston chamber 24 in which the piston unit 14 is slidably supported, a pair of pressure chambers (26a, 26b) into which pressure oil serving as the pressure medium is introduced are defined between the cylinder 12 and the pair of arc pistons (14a, 14b). One pressure chamber 26a is defined by the arc piston 14a in the pair of arc pistons (14a, 14b), the piston chamber 24, and one end face of the plug block 25 exposed in the longitudinal direction of the piston chamber 24. The other pressure chamber 26b is defined by the other arc piston 14b in the pair of arc pistons (14a, 14b), the piston chamber 24, and the other end face of the plug block 25 exposed in the longitudinal direction of the piston chamber 24.

To the pressure chamber 26a, a feed/drain hole 29a through which the pressure oil is fed and drained is open. To the pressure chamber 26b as well, a feed/drain hole 29b through which the pressure oil is fed and drained is open. The feed/drain holes 29a are provided so as to penetrate the cylinder 12 in its axial direction through the cylinder blocks 26. The feed/drain holes 29a in the respective cylinder blocks 26 are arranged in series through the plurality of cylinder blocks 26 so as to communicate with one another. The feed/drain hole 29b is also provided so as to penetrate the cylinder 12 in its axial direction through the cylinder blocks 26. The feed/drain holes 29b in the respective cylinder blocks 26 are arranged in series through the plurality of cylinder blocks 26 so as to communicate with one another.

The pressure oil is fed to the pressure chamber (one of the pressure chambers 26a and 26b)) defined by one of the pair of arc pistons (14a, 14b), and is drained from the pressure chamber (the other pressure chamber 26a or 26b) defined by the other arc piston 14a or 14b, thereby displacing the pair of arc pistons (14a, 14b). Thus the arm 15 urged by the pair of arc pistons (14a, 14b) is displaced in the circumferential direction of the cylinder 12, and the output shaft 13, together with the arm 15, pivots in a rotational direction around the rotation center that is the axial center of the output shaft 13.

Note that since the feed/drain holes 29a in the cylinder blocks 26 communicate with one another in the rotary actuator 1, the pressure oil are substantially simultaneously fed into, and substantially simultaneously drained from, the plurality of pressure chambers 26a. Similarly, since the feed/drain holes 29b in the cylinder blocks 26 communicate with one another, the pressure oil is fed with substantially the same timing into, and drained with substantially the same timing from, the plurality of pressure chambers 26b.

In a state where, for example, the pressure oil is fed from the feed/drain holes 29a and drained from the feed/drain hole 29b, the arc pistons (14a, 14b) are displaced clockwise along the circumferential direction of the cylinder 12 in FIG. 2. Thus the arm 15 and the output shaft 13 pivot clockwise along the circumferential direction of the cylinder 12 in FIG. 2. On the other hand, in a state where the pressure oil is fed from the feed/drain holes 29b and drained from the feed/drain holes 29a, the arc pistons (14a, 14b) are displaced anticlockwise along the circumferential direction of the cylinder 12 in FIG. 2. Thus the arm 15 and the output shaft 13 pivots anticlockwise along the circumferential direction of the cylinder 12 in FIG. 2.

Further, in the rotary actuator 1, a continuous hole 30 that communicates with the hollow space 23 is open to, for example, the lid portion 22b of the case 11. The continuous hole 30 communicates with the reservoir circuit 36 (see FIG. 5) provided with the tank in which the oil released into atmospheric pressure is accumulated. Thus the hollow space 23 in which the output shaft 13 and the arm 15 are installed constantly functions as a low-pressure chamber.

Note that the assembly operation of the above-described rotary actuator 1 can be implemented in various orders. Next, an exemplary assembly procedure of the rotary actuator 1 will be discussed. First, for example, an integrated molding of the output shaft 13 and the arm 15 is attached to the lid portion 22b in a state where the lid portion 22b is held by a jig. Then, the cylinder blocks 26 are sequentially put together in series in the axial direction of the cylinder 12 in a state where the output shaft 13 and the arm 15 are inserted inside the hollow space 23.

When the cylinder blocks 26 are sequentially put together, the plug block 25 to which the seal members 25a are attached and the pair of arc pistons (14a, 14b) to which the seal members 32 and the ring members 33 are attached are installed in each piston chamber 24 between the cylinder blocks 26. At the stage where assembly by putting together the cylinder blocks 26 is finished, the case main body portion 21 is placed on the outer circumference of the cylinder 12 so that the cylinder 12 is inserted into the case main body portion 21. After finishing placing the case main body portion 21, the lid portion 22a is attached and fixed to the case main body portion 21. The outline of the assembly operation for the rotary actuator 1 is thus completed.

Figure 5:
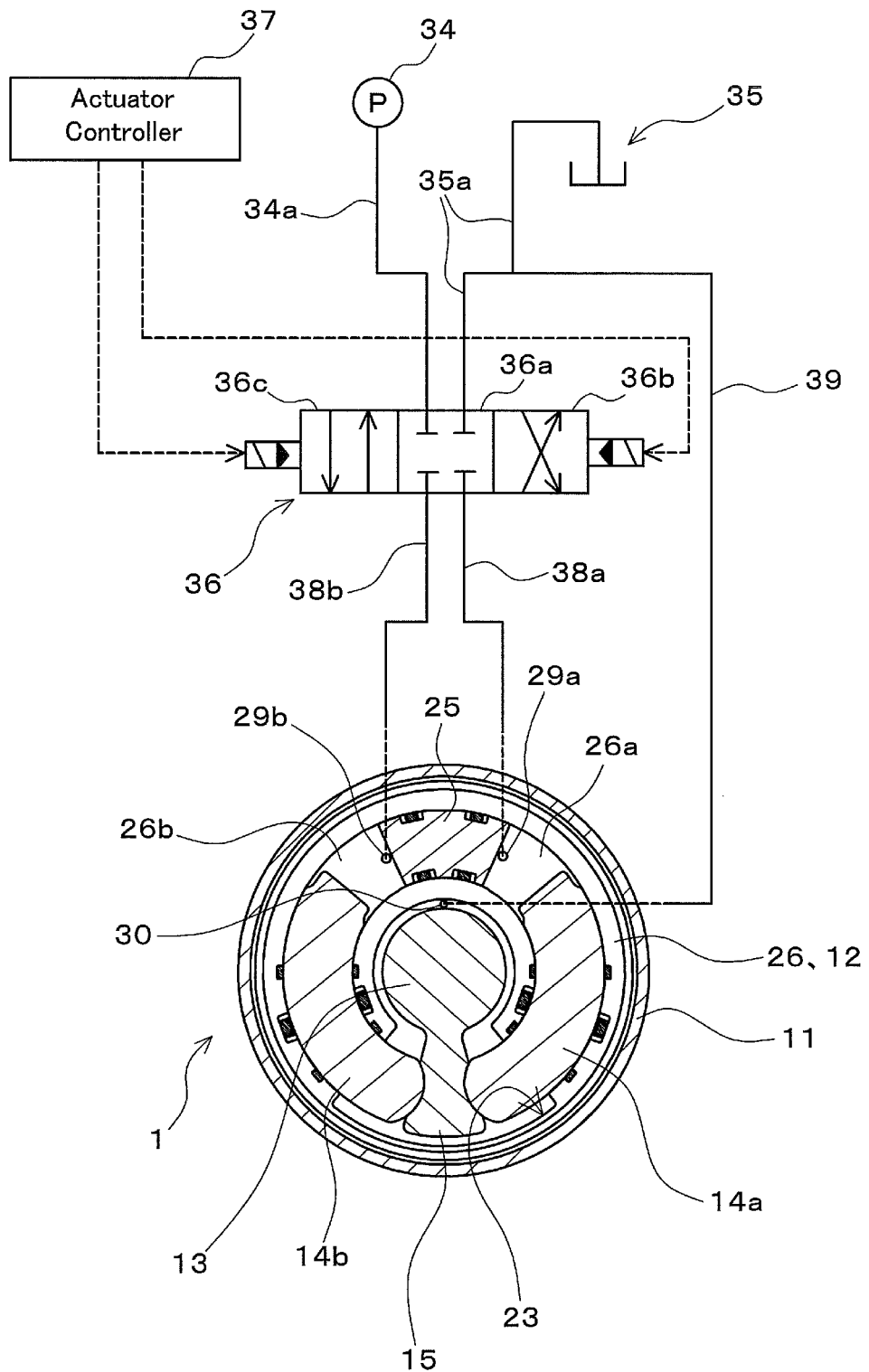
FIG. 5 is a circuit diagram schematically showing a hydraulic circuit for controlling operation of the rotary actuator shown in FIG. 2.

Next, the configuration of the hydraulic circuit for controlling the operation of the above-described rotary actuator 1 and the actuation of the rotary actuator 1 will be discussed. FIG. 5 is a circuit diagram schematically showing the hydraulic circuit for controlling the operation of the rotary actuator 1, together with the cross-sectional view of the rotary actuator 1 shown in FIG. 2. As shown in FIG. 5, the pressure oil serving as the pressure medium is fed to the rotary actuator 1 from a hydraulic power unit 34, which is a pressure medium supply source in the present embodiment. The hydraulic power unit 34 has a hydraulic pump. The pressure oil drained from the rotary actuator 1 flows into, and returns to, the above-mentioned reservoir circuit 35. The pressure oil, after returning to the reservoir circuit 35, is pressurized by the hydraulic power unit 34, and is fed again to the rotary actuator 1.

Between the rotary actuator 1 and the hydraulic power unit 34 and reservoir circuit 35, a control valve 36 for switching a pressure oil feeding path to the rotary actuator 1 and a pressure oil drain path from the rotary actuator 1 is provided. That is, the rotary actuator 1 is connected to the hydraulic power unit 34 and the reservoir circuit 35 via the control valve 36.

The control valve 36 is provided as a valve mechanism for switching the state of connection between a pair of feed/drain paths (38a, 38b) that communicate with the rotary actuator 1 and the feed path 34a communicating with the hydraulic power unit 34 and drain path 35a communicating with the reservoir circuit 35. The feed/drain path 38a communicates with the feed/drain holes 29a in the cylinder blocks 26, and the feed/drain path 38b communicates with the feed/drain holes 29b in the cylinder blocks 26. Note that a branch path 39 is branched from the drain path 35a. This branch path 39 connects the drain path 35a to the continuous hole 30 in the case 11.

Further, the control valve 36 is provided as, for example, an electrohydraulic servo valve (EHSV). The control valve 36 operates to switch the state of connection between the feed/drain paths (38a, 38b) and the feed path 34a and drain path 35a based on an instruction signal given by an actuator controller 37 for controlling the operation of the rotary actuator 1. More specifically, in the control valve 36, a nozzle-flapper pressure oil amplification mechanism at the pilot stage is driven based on an electric instruction signal given by the actuator controller 37, and the pressure of the pilot pressure oil introduced into both ends of a spool at the main stage is controlled. Then, with the pilot pressure oil produced at the pilot stage, the position of the spool at the main stage is proportionally controlled, and the state of connection between the paths 34a and 35a and the paths (38a, 38b) is also switched.

With the above-described configuration, the control valve 36 is able to proportionally switch the position thereof among a neutral valve position 36a, a first switching position 36b, and a second switching position 36c. In a state of being switched to the neutral valve position 36a, the control valve 36 disconnects the feed path 34a and the drain path 35a from the feed/drain paths (38a, 38b). Thus feed and drain of the pressure oil to/from the pair of pressure chambers (26a, 26b) in each piston chamber 24 are stopped. The pair of arc pistons (14a, 14b) provided in each piston chamber 24 keep stopping.

Upon the control valve 36 being switched from the neutral valve position 36a to the first switching position 36b, the feed path 34a and the feed/drain path 38a are connected to each other, and the pressure oil is fed to the pressure chamber 26a in each piston chamber 24. Meanwhile, the drain path 35a and the feed/drain path 38b are connected to each other, and the pressure oil is drained from the pressure chamber 26b in each piston chamber 24. Thus the arc pistons (14a, 14b) are displaced clockwise along the circumferential direction of the cylinder 12 in FIG. 5. On the other hand, upon the control valve 36 being switched from the neutral valve position 36a to the second switching position 36c, the feed path 34a and the feed/drain path 38b are connected to each other, and the pressure oil is fed to the pressure chamber 26b in each piston chamber 24. Meanwhile, the drain path 35a and the feed/drain path 38a are connected to each other, and the pressure oil is drained from the pressure chamber 26a in each piston chamber 24. Thus the arc pistons (14a, 14b) are displaced anticlockwise along the circumferential direction of the cylinder 12 in FIG. 5. As described above, in the state where the control valve 36 is switched to the first switching position 36b and in the state where the control valve 36 is switched to the second switching position 36c, the pair of arc pistons (14a, 14b) installed in each piston chamber 24 are driven to move in the opposite direction in the circumferential direction of the cylinder, and the arm 15 and the output shaft 13 are also driven to pivot in opposite directions.

As a result of the output shaft 13 pivoting, driving torque is output by the output shaft 13. The driving torque may be output only from one of the end portions (13b, 13c) of the output shaft 13, or may be output from both the end portions (13b, 13c) of the output shaft 13. Note that the driving torque output by the output shaft 13 is output for an object to be driven that is connected to at least one of the end portions (13b, 13c). The object to be driven may be various kinds of equipment. For example, a moving surface such as a control surface pivotably provided on a wing of an aircraft may be driven by the rotary actuator 1. Furthermore, the rotary actuator 1 may be applied to steering equipment for cars.

Note that in the above-described embodiment, the control valve 36 and the actuator controller 37 are not described as components of the rotary actuator 1, but those may alternatively be included in the components of the rotary actuator 1. For example, the rotary actuator 1 may be defined as having a configuration including the control valve 36 as a component thereof. Alternatively, the rotary actuator 1 may be defined as having a configuration including the control valve 36 and the actuator controller 37 as components thereof.

As discussed above, with the rotary actuator 1, the pressure oil is fed to one of the pair of pressure chambers (26a, 26b) and is drained from the other pressure chamber inside the cylinder 12 installed within the case 11, and the pair of arc pistons (14a, 14b) thereby slide and are displaced in the circumferential direction of the cylinder 12. As a result of the arm 15 being urged by the pair of the arc pistons (14a, 14b), the output shaft 13 pivots in the rotational direction, and the driving torque of the rotary actuator 1 is output. Therefore, in the rotary actuator 1, the pressure chambers (26a, 26b) are defined between the cylinder 12 and the arc pistons (14a, 14b) that slide with respect to the cylinder 12 within the cylinder 12. Thus, such a structure provided with pressure chambers defined by an output shaft, vanes, a cylinder, ribs, and end caps, as the structure of the conventional rotary actuators, is not necessary. That is, the rotary actuator 1 does not need such rotary sliding portions between an output shaft and ribs provided to a cylinder, between a cylinder and vanes provided to a rotary output shaft, and between the rotary output shaft with the vanes and end caps, as those provided to the conventional rotary actuators. As a result, according to the present embodiment, internal leakage of the pressure oil (pressure medium) within the rotary actuator 1 can be reduced. In addition, the rotary actuator 1 does not need high-pressure rotary seals that are used in the rotary sliding portions and pressed with high pressure against the surface relative to which the seals slide.

Therefore, according to the present embodiment, it is possible to provide the rotary actuator 1 with which internal leakage of the pressure medium can be reduced and the structure that does not need the high-pressure rotary seals can be achieved.

Furthermore, in the rotary actuator 1, the cylinder 12 is assembled by putting together the plurality of cylinder blocks 26 in the axial direction of the cylinder 12, and the piston chambers 24 are defined between the adjoining cylinder blocks 26. Therefore, when the piston chambers 24 are formed, a semicircular groove is formed on each cylinder block 26, and the grooves are combined to constitute the piston chambers 24. It is thus possible to easily form the piston chambers 24 for housing the arc pistons (14a, 14b) that slide and are displaced in the circumferential direction of the cylinder 12, and to easily manufacture the cylinder 12.

Moreover, in the rotary actuator 1, the arm 15 is urged by the piston units 14 that are arranged in line in the axial direction of the output shaft 13, and the output shaft 13 is thereby driven. Therefore, it is possible to output a larger amount of driving torque with a compact structure, without increasing the size of the cylinder 12 in its radial direction.

Although an embodiment of the present invention has been described thus far, the present invention is not limited to the embodiment described above, and various modifications may be made within the scope recited in the claims. For example, the following modifications are possible.

(1) Although the above embodiment has been described, taking, as an example, a mode in which the cylinder is integrally assembled by putting together the cylinder blocks, this need not be the case. For example, the cylinder may be manufactured in a mode in which a block-shaped member used as a material for the cylinder is punched by electromechanical machining to form the piston chambers.

Figure 6:
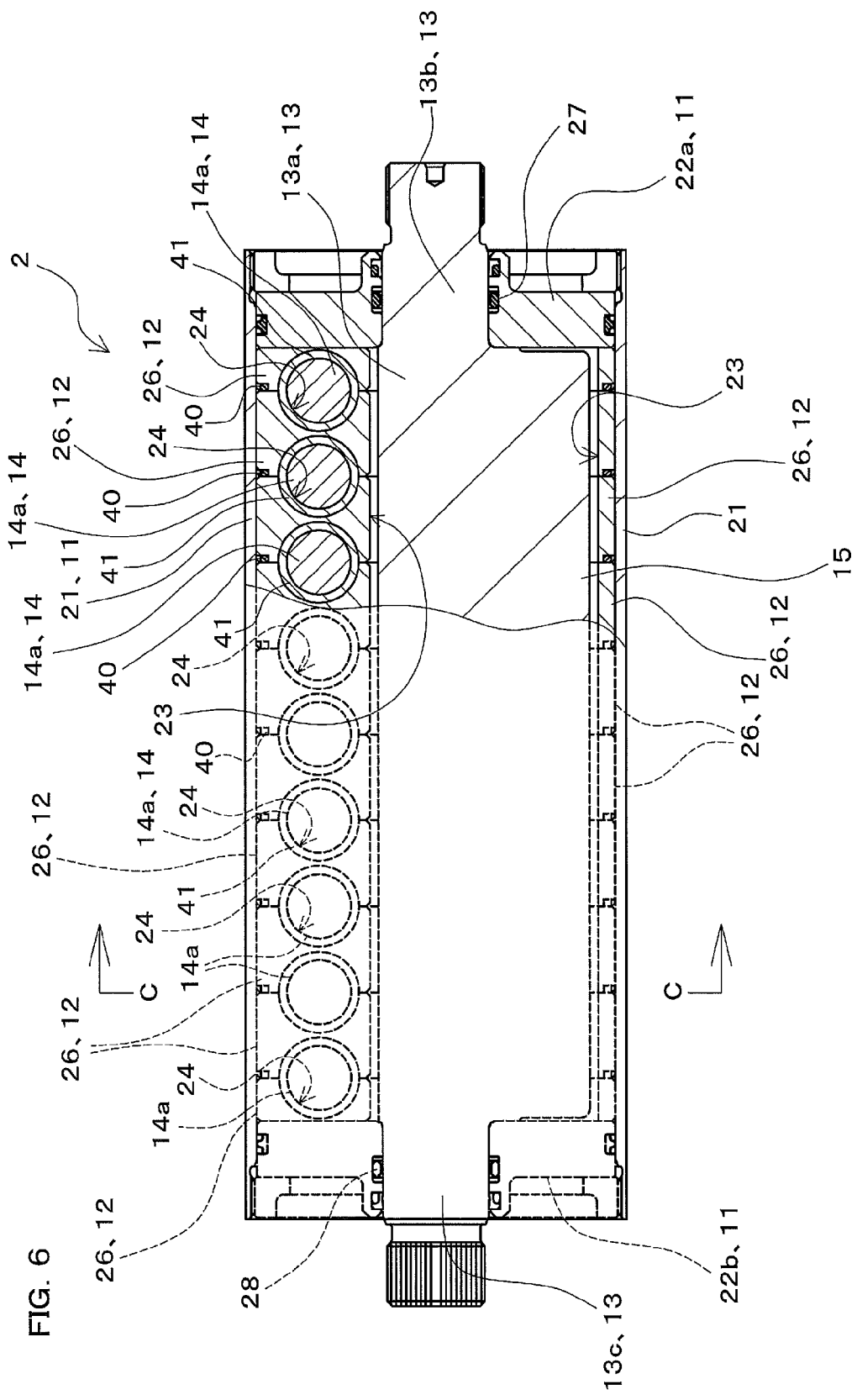
FIG. 6 is a diagram showing a rotary actuator according to a modification including a partial cross-sectional view thereof, viewed from a direction perpendicular to an axial direction thereof.
Figure 7:
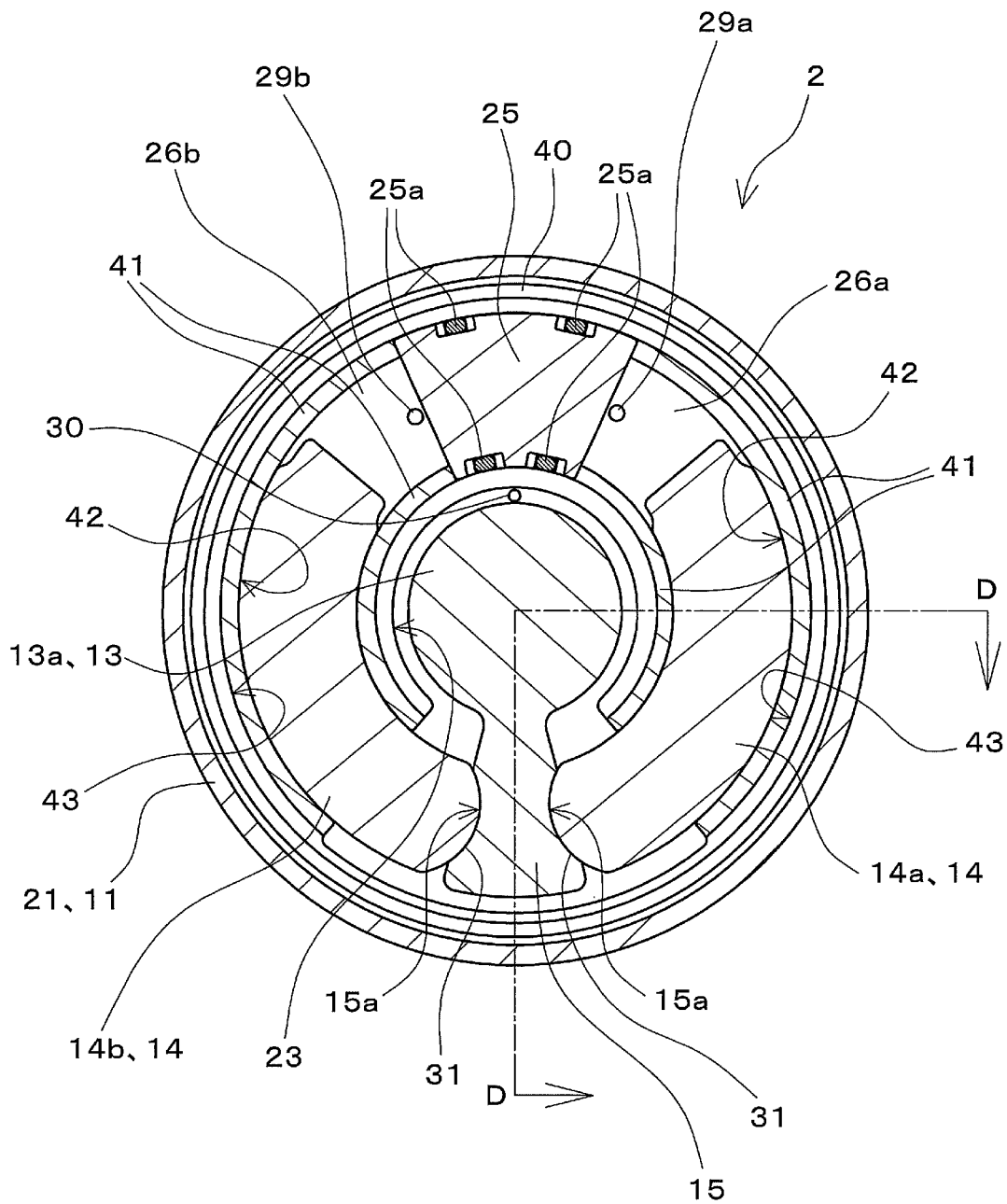
FIG. 7 is a cross-sectional view of the rotary actuator shown in FIG. 6, viewed along arrows C-C.

(2) Although the above embodiment have been described, taking, as an example, a mode in which the piston chambers are defined between the adjoining cylinder blocks by combining the grooves with a semicircular cross section that are formed on the respective cylinder blocks, this need not be the case. As shown in FIGS. 6 and 7, it is possible to implement a mode in which the piston chambers are defined by tubular hollow members that are installed in holes provided in the cylinder main body and extend in an arc.

FIG. 6 is a diagram showing a rotary actuator 2 according to a modification of the present invention including a partial cross-sectional view thereof, viewed from a direction perpendicular to an axial direction. FIG. 7 is a cross-sectional view of the rotary actuator 2, viewed along arrows C-C in FIG. 6. FIG. 7 includes the cross-section viewed along arrows D-D in FIG. 6. The rotary actuator 2 shown in FIGS. 6 and 7 is different from the rotary actuator 1 in the structure for defining the piston chambers 42. Note that in the following description of the rotary actuator 2, the components configured in the same manner as those of the rotary actuator 1 are denoted by the same reference numerals in the figures, and the description thereof will be omitted. Only the features different from those of the rotary actuator 1 will be described.

In the rotary actuator 2, the plurality of cylinder blocks 26 that are put together integrally and the plug blocks 25 installed between the adjoining cylinder blocks 26 constitute the main body of the cylinder 12. The cylinder 12 in the rotary actuator 2 is further provided with tubular hollow members 41 extending in an arc.

A plurality of hollow members 41 are provided, and a pair of hollow members 41 (i.e., two hollow members 41) is installed in a hole 43 provided by combining two adjoining cylinder blocks 26 in the main body of the cylinder 12. A piston chamber 42 for housing the arc pistons (14a, 14b) that are supported so as to be able to slide and are displaced with respect to the cylinder 12 is defined by the inner wall of each hollow member 41. Note that when molding the hollow member 41, a tubular hollow member, for example, is used as a material thereof. After, for example, this material is bent in an arc, the material is further subjected to press work using isostatic molding, and thus the tubular hollow member 41 that smoothly extending in an arc is molded.

In the rotary actuator 2 according to the above-described modification, the member for defining each piston chamber 42 is constituted by the tubular hollow member 41 provided as a separate member from the main body of the cylinder 12. It is therefore possible to easily form the piston chamber 42 having a structure in which the surfaces relative to which the arc pistons (14a, 14b) slide are seamless, and further, internal leakage can be reduced.

(3) The shape of the arm, the number of the installed arms, and the installation position are not limited to those in the mode taken as an example in the above embodiment, and may be modified in various ways for implementation. For example, although the above embodiment has been described, taking, as an example, the mode in which a single arm is provided so as to extend from the output shaft in the radial direction of the cylinder, this need not be the case. A plurality of arms may be provided so as to extend in the radial direction of the cylinder from a plurality of positions on the output shaft.

Figure 8:
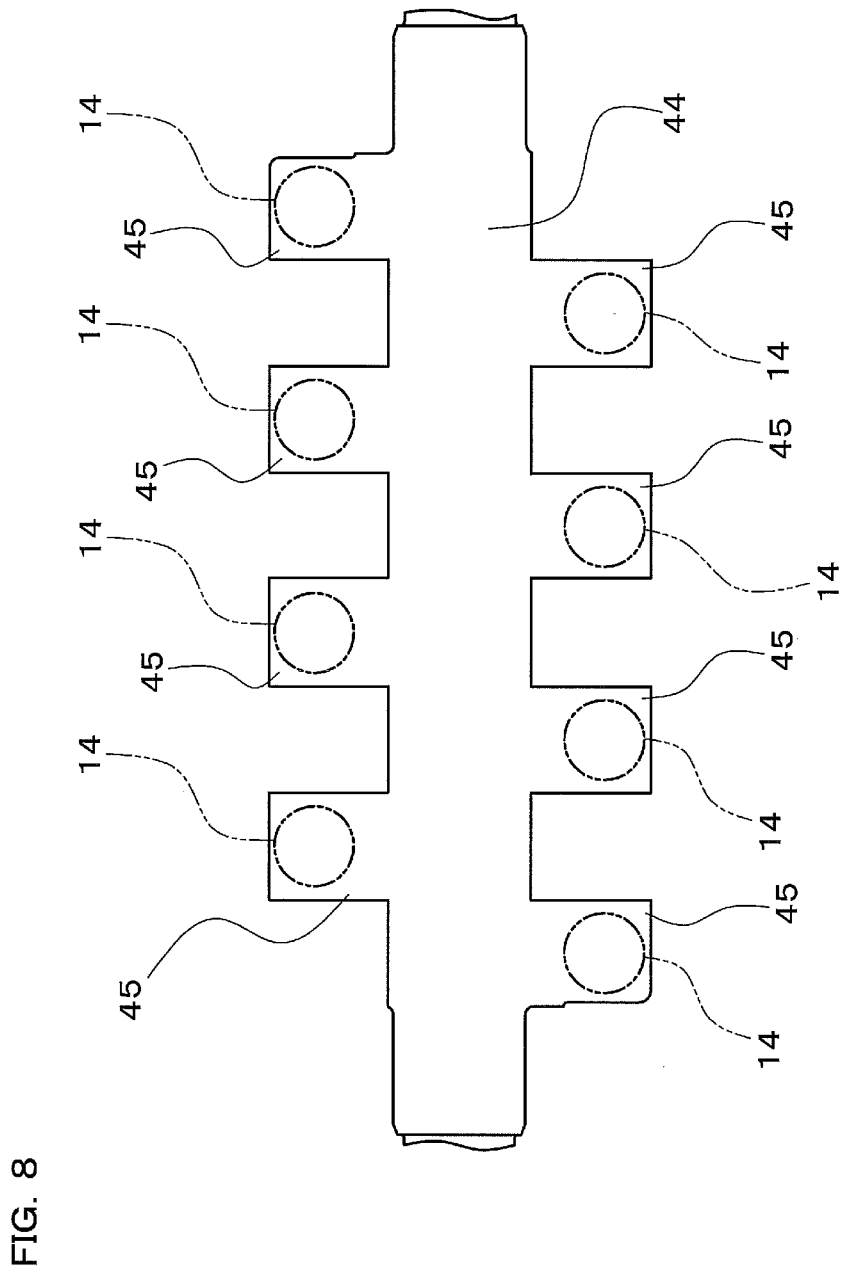
FIG. 8 is a diagram showing an output shaft and an arm in the rotary actuator according to a modification.

FIG. 8 is a diagram showing an output shaft 44 and arms 45 in the rotary actuator according to the modification. In the modification shown in FIG. 8, a plurality of arms 45 are provided so as to extend in the radial direction of the cylinder (not shown) from a plurality of positions on the output shaft 44. Note that in FIG. 8, the positions abutted by the piston units 14 for urging the arms 45 are denoted by two-dot chain lines with numerical reference "14". In this modification, a mode in which the arms 45 are provided so as to extend in radial direction of the cylinder from the plurality of positions arrayed in the axial direction of the output shaft 44 is taken as an example. Each two arms 45 located at positions adjoining in the axial direction of the output shaft 44 are provided so as to extend in the radial directions of the cylinder forming an angle therebetween in the circumferential direction thereof of 180 degrees.

Although the mode of the output shaft 44 and the arms 45 shown in FIG. 8 is an exemplary mode in which the plurality of arms extending in the radial direction of the cylinder from the plurality of positions on the output shaft are provided, this need not be the case, and a mode in which the plurality of arms are provided on the output shaft may alternatively be implemented. As a result of the arms being provided so as to extend in the radial direction from the plurality of positions on the output shaft, if more than one unit of pairs of pistons for driving the output shaft to rotate via the arms are installed, the installation positions thereof can be designed more freely.

(4) Although the above embodiment has been described, taking, as an example, a mode in which all piston units simultaneously operate, this need not be the case. A mode in which among the piston units, the number of the piston units that generate urging force applied to the arm can be changed to drive the arm may also be implemented.

Figure 9:
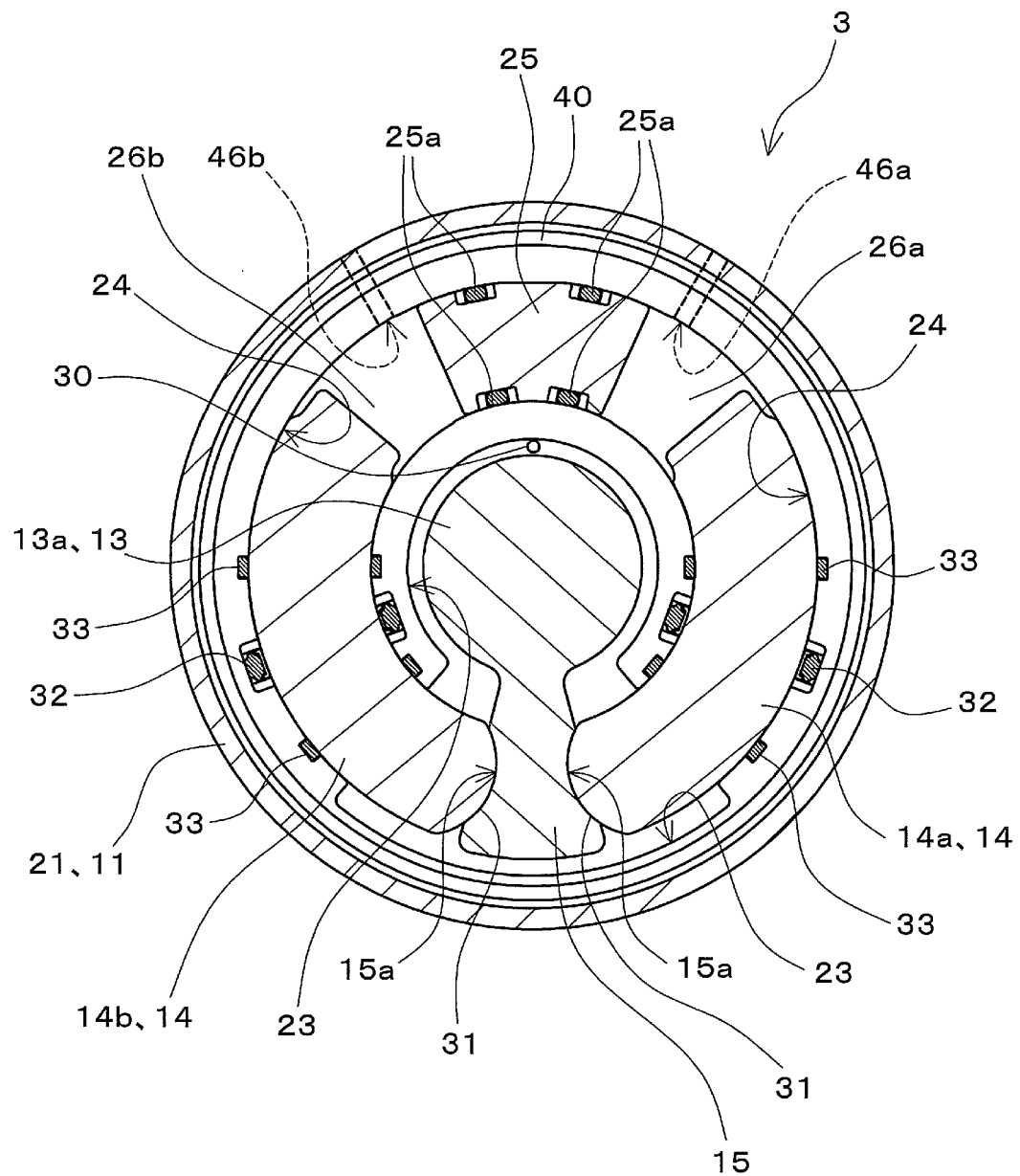
FIG. 9 is a cross-sectional view of the rotary actuator according to a modification, viewed from a direction perpendicular to the axial direction thereof.

FIG. 9 is a cross-sectional view of a rotary actuator 3 according to a modification taken along a direction perpendicular to the axial direction. The rotary actuator 3 shown in FIG. 9 is different from the rotary actuator 1 in that the number of the piston units that generate urging force applied to the arm is changed to drive the arm. Note that in the following description of the rotary actuator 3, the components configured in the same manner as those of the rotary actuator 1 are denoted by the same reference numerals in the figures, and the description thereof will be omitted. Only the features different from those of the rotary actuator 1 will be described.

As shown in FIG. 9, in the rotary actuator 3, feed/drain holes (46a, 46b) are open respectively to the pair of pressure chambers (26a, 26b) in each piston chamber 24. The feed/drain holes 46a are open to the respective pressure chambers 26a to define feed/drain ports each passing, in the radial direction of the cylinder 12, through one of two adjoining cylinder blocks 26 that define each piston chamber 24, and also passing through the case 11. The feed/drain holes 46b are open to the respective pressure chambers 26b to form feed/drain ports each passing, in the radial direction of the cylinder 12, through one of two adjoining cylinder blocks 26 that form each piston chamber 24, and also passing through the case 11.

With the above-described configuration, the rotary actuator 3 is capable of individually feeding and draining the pressure oil (pressure medium) to and from the pairs of pressure chambers (26a, 26b) in the piston chambers 24, unlike the rotary actuator 1 in the above-described embodiment. That is, in the rotary actuator 3, the number of piston units 14 that generate urging force applied to the arm 15 can be changed to drive the arm 15.

Figure 10:
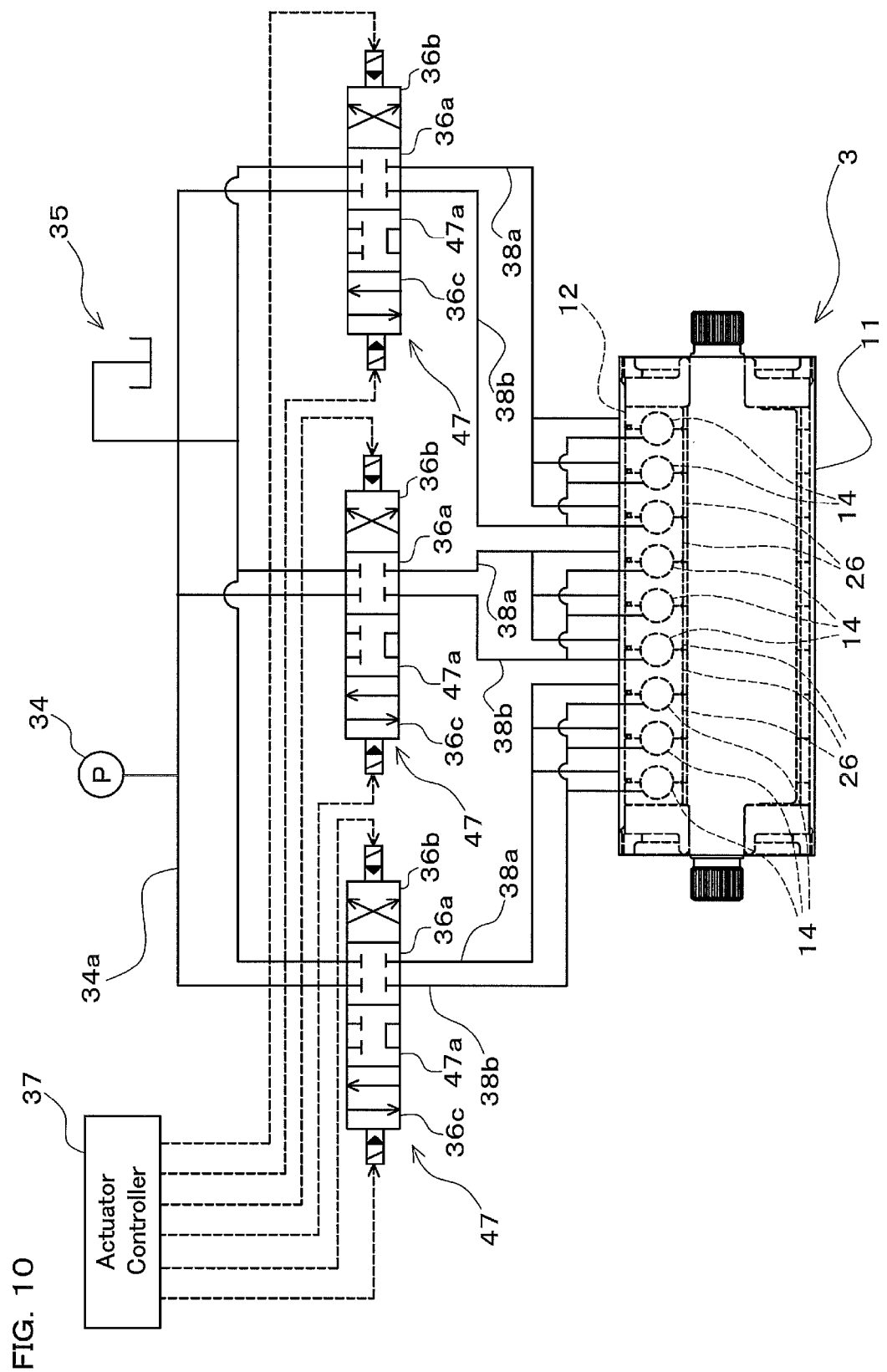
FIG. 10 is a circuit diagram schematically showing a hydraulic circuit for controlling operation of the rotary actuator shown in FIG. 9.

FIG. 10 is a circuit diagram schematically showing a hydraulic circuit for controlling operation of the rotary actuator 3. FIG. 10 shows an exemplary hydraulic circuit configuration in which the piston units 14 are divided into three groups, and control valves 47s are provided to the respective groups. Note that in the exemplary hydraulic circuit shown in FIG. 10, a mode in which three piston units 14 constitute one group is taken as an example. Each control valve 47 individually operates based on an instruction given by the actuator controller 37. Note that the control valves 47, each having a similar configuration to that of the control valve 36 in the above-described embodiment, are different from the control valve 36 in that each control valve 47 is also provided with a bypass position 47a at which the pair of pressure chambers (26a, 26b) can be bypassed to communicate with each other.

Furthermore, each control valve 47 is configured to control feed and drain of the pressure oil (pressure medium) that acts on three piston units 14 belonging to one of the three groups. Therefore, the feed/drain path 38a communicating with each control valve 47 communicates with the feed/drain hole 46a that is open to the three pressure chambers 26a corresponding to the three piston units 14 belonging to the group associated with the control valve 47. The feed/drain path 38b communicating with each control valve 47 communicates with the feed/drain hole 46b that is open to the three pressure chambers 26b corresponding to the three piston units 14 belonging to the group associated with the control valve 47.

The rotary actuator 3 operates under the control of the control valves 47 that operate based on instruction signals given by the actuator controller 37. The control valve 47 associated with the group of the piston units 14 that generate urging force for urging the arm 15 is switched to the first switching position 36b or the second switching position 36c. Meanwhile, the control valve 47 associated with the group of the piston units 14 that do not generate urging force for urging the arm 15 is switched to the bypass position 47a. One or more group(s) of the piston units 14 that generate urging force for urging the arm 15 is appropriately selected based on the instruction signal given by the actuator controller 37. As a result, among the plurality of piston units 14, the number of the piston units 14 that generate urging force applied to the arm 15 is changed to drive the arm 15.

With the rotary actuator 3, among the plurality of piston units 14, the number of the piston units 14 that generate urging force applied to the arm 15 can be changed to drive the arm 15, and it is therefore possible to easily achieve the structure of the rotary actuator 3 with which the output is variable.

Note that in the above-described embodiment, the control valve 47 and the actuator controller 37 are not described as components of the rotary actuator 3, but those may alternatively be included in the rotary actuator 3 as components thereof. For example, the rotary actuator 3 may be defined as having a configuration including the control valve 47 as a component thereof. Alternatively, the rotary actuator 3 may be defined as having a configuration including the control valve 47 and the actuator controller 37 as components thereof.

The present invention can be applied broadly to rotary actuators that output driving torque as a result of output shafts thereof pivoting in a rotational direction due to action of a pressure medium. The present invention is not limited to the above-described embodiment, and all modifications, applications and equivalents thereof that fall within the claims, for which modifications and applications would become apparent by reading and understanding the present specification, are intended to be embraced therein.

What is claimed is:

1. A rotary actuator that outputs driving torque as a result of an output shaft pivoting in a rotational direction due to action of a pressure medium, the rotary actuator comprising:
a case;
a cylinder that is installed within the case and internally has a hollow space;
an output shaft that is rotatably supported with respect to the case, has an axial direction parallel to an axial direction of the cylinder, and is installed in the hollow space;
an arm that is integrated with or fixed to the output shaft, and extending in a radial direction of the cylinder; and
a pair of pistons each of which is in an arc shape having a circular cross section, extending in the circumferential direction of the cylinder, and is installed within the cylinder and supported so as to be able to slide and be displaced with respect to the cylinder along a circumferential direction of the cylinder,
each of the pair of pistons being provided at its terminal end of the arc shape portion with an end surface so as to be able to abut and urge the arm from both sides of the arm in the circumferential direction of the cylinder,
a pressure chamber into which a pressure medium is introduced being defined between each of the pistons and the cylinder,
the arm being displaced in the circumferential direction of the cylinder and the output shaft pivoting in the rotational direction, as a result of the pressure medium being fed to the pressure chamber defined by one of the pistons and drained from the pressure chamber defined by the other piston.

2. The rotary actuator according to claim 1,
wherein the cylinder includes a plurality of cylinder blocks formed in a divided state, the cylinder is integrally assembled by putting together the plurality of cylinder blocks along the axial direction of the cylinder, and
the cylinder is provided with a piston chamber that houses the pistons supported so as to be able to slide and be displaced with respect to the cylinder,
the piston chamber is defined between the cylinder blocks adjoining in the axial direction of the cylinder.

3. The rotary actuator according to claim 1,
further comprising a plurality of piston units, each being constituted by the pair of pistons,
wherein the plurality of piston units are arranged in line along an axial direction of the output shaft.

4. The rotary actuator according to claim 3,
wherein among the plurality of piston units, the number of piston units that generate urging force applied to the arm can be changed to drive the arm.

5. The rotary actuator according to claim 1,
wherein a plurality of arms are provided so as to extend in the radial direction of the cylinder from a plurality of positions on the output shaft.

6. The rotary actuator according to claim 1,
wherein the cylinder is provided with a piston chamber that houses the pistons supported so as to be able to slide and be displaced with respect to the cylinder, and
the piston chamber is defined by a tubular hollow member that is installed in a main body of the cylinder and extends in an arc.

* * * * *